United States Patent [19]

Yasuda et al.

[11] Patent Number: 5,401,278
[45] Date of Patent: Mar. 28, 1995

[54] METHOD OF MAKING BATTERY PLATES FOR LEAD ACID STORAGE BATTERIES

[75] Inventors: Hiroshi Yasuda; Kazuyoshi Yonezu, both of Toyohashi; Hiroshi Okamoto, Hamamatsu; Katsuhiro Takahashi, Toyohashi, all of Japan

[73] Assignee: Matsushita Electric Industrial Co., Ltd., Osaka, Japan

[21] Appl. No.: 42,513

[22] Filed: Apr. 5, 1993

[30] Foreign Application Priority Data

Apr. 9, 1992 [JP] Japan .................................. 4-088509

[51] Int. Cl.⁶ .............................................. H01M 4/82
[52] U.S. Cl. .......................................... 29/2; 429/242; 429/249
[58] Field of Search ...................... 429/242, 249; 29/2

[56] References Cited

U.S. PATENT DOCUMENTS 3,881,952  5/1975  Wheadon et al. .
4,279,977  7/1981  Matter .
4,906,540  3/1990  Hoshihara et al. .

FOREIGN PATENT DOCUMENTS 185365  9/1985  Japan .

OTHER PUBLICATIONS

*Lead Acid Batteries,* Hans Bode, pp. 219–221, 1977.

*Primary Examiner*—Prince Willis, Jr.
*Assistant Examiner*—M. Muzzolillo
*Attorney, Agent, or Firm*—Stevens, Davis, Miller & Mosher

[57] ABSTRACT

A battery plate for lead acid storage batteries using a grid prepared by expanding a lead-calcium-tin (Pb—Ca—Sn) alloy sheet, is made by expanding a Pb—Ca—Sn alloy sheet having a tensile strength of 6.0 kg/mm² or lower and an Sn content of 0.6–1.8% by weight to make a grid, filling this grid with an active material paste, and then aging the grid to increase the tensile strength of the expanded grid to 7.0 kg/mm² or higher. The workability in expanding of the Pb—Ca—Sn alloy sheet can be improved and furthermore, concentration of stress strain on the nodes of the grid can be inhibited and thus, corrosion of the nodes can be inhibited. The aging can provide a battery pate having a high tensile strength and a lead acid storage battery having an excellent charge-discharge cycle life characteristics.

3 Claims, 4 Drawing Sheets

F I G. 1
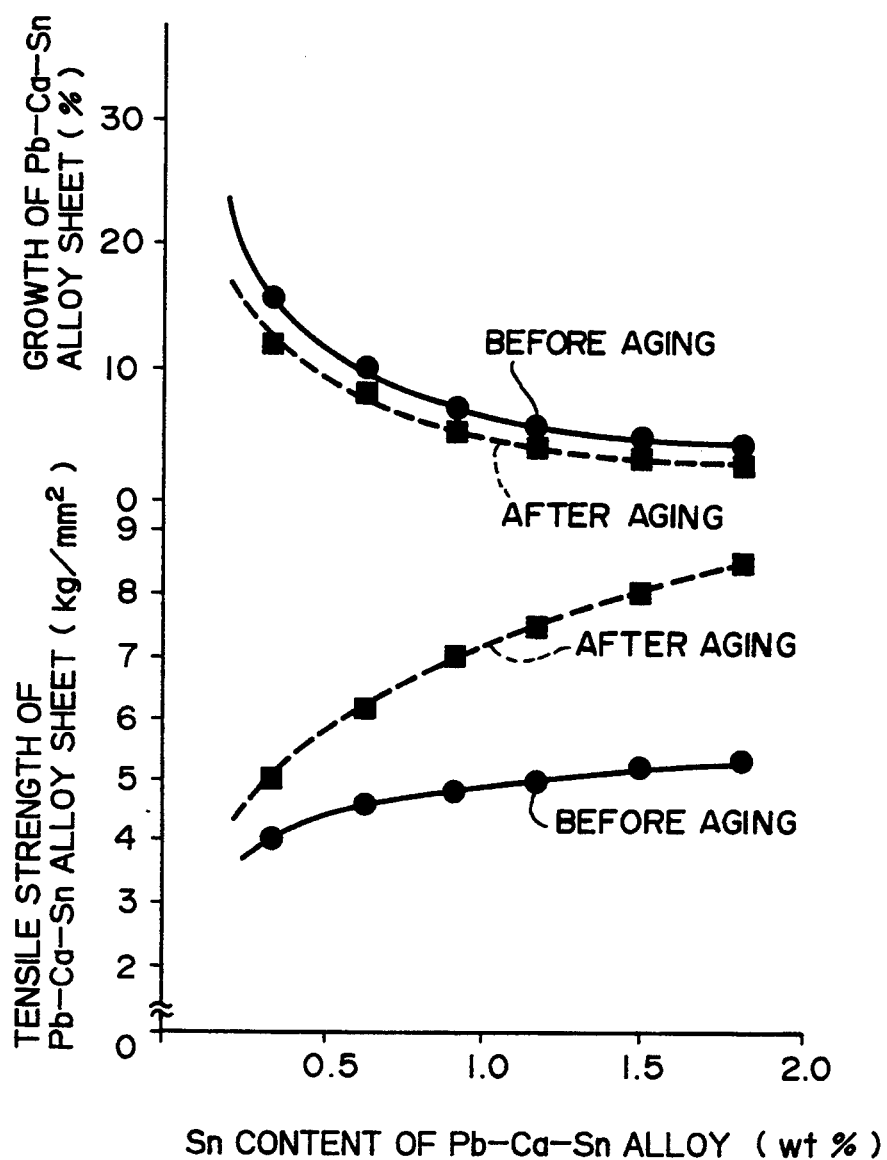

F I G. 4
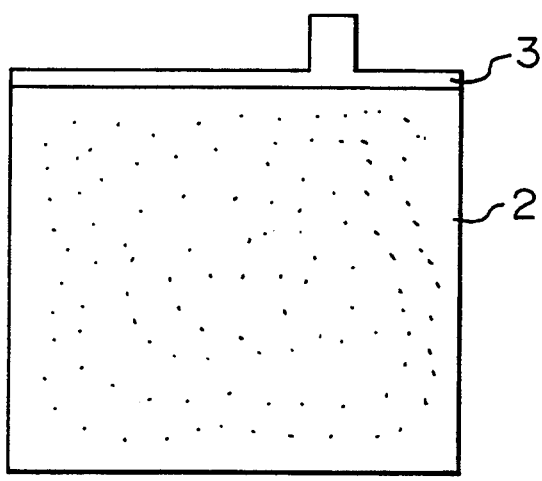
F I G. 5
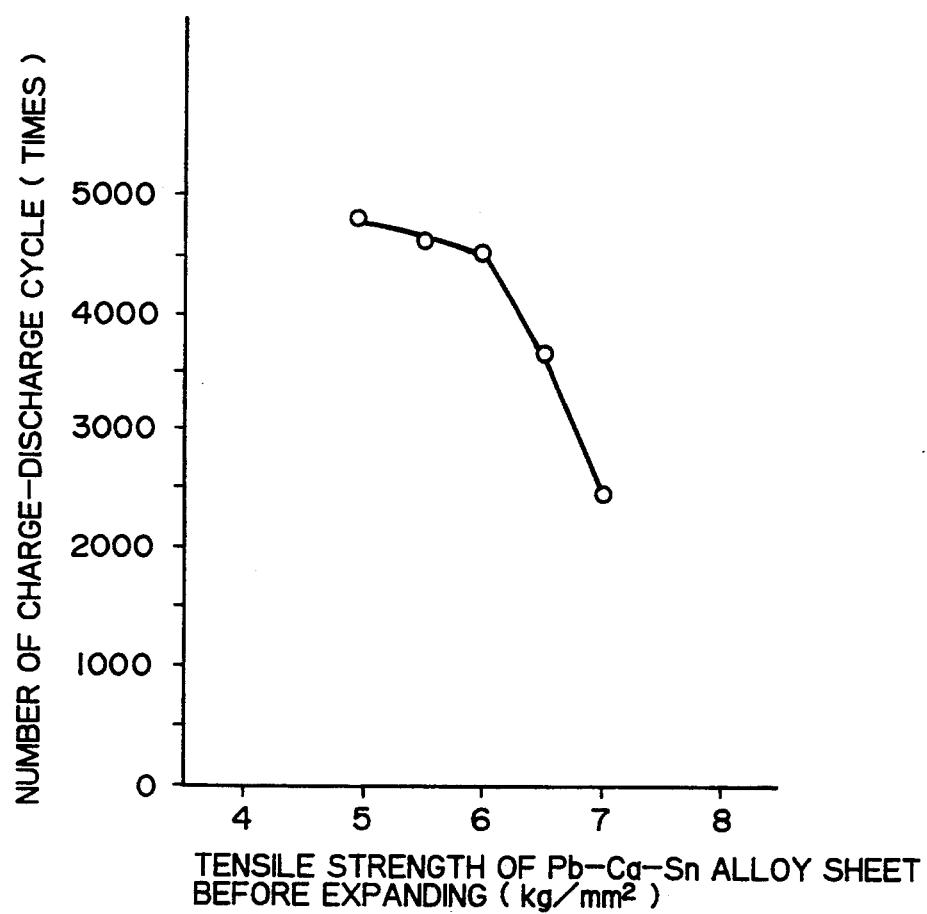

METHOD OF MAKING BATTERY PLATES FOR LEAD ACID STORAGE BATTERIES

BACKGROUND OF THE INVENTION

1. Technical Field of the Invention

The present invention relates to a method of making a battery plate for lead acid storage batteries, especially a method for making a battery plate using a grid comprising a lead-calcium-tin alloy.

2. Prior Art

Hitherto, a lead-antimony (Pb—Sb) alloy has been mainly used as a grid or battery plate for lead acid storage batteries, but the batteries using the alloy as grid suffer from the problems that the amount of an electrolyte decreases due to overcharge of the batteries occurs owing to antimony. Therefore, a lead-calcium-tin (Pb—Ca—Sn) alloy free from the self-discharge has been increasingly used as the alloy for the grid.

Production of a battery plate using a grid of such a Pb—Ca—Sn alloy is disclosed in U.S. Pat. Nos. 3,881,952 and 4,279,977.

Generally, battery plates are produced by expanding a rolled sheet of the Pb—Ca—Sn alloy to form a grid and filling the expanded grid with an active material paste. Furthermore, the resulting expanded grid is kept at a strength desired by the plate by age hardening it.

However, a lead acid storage battery using a Pb—Ca—Sn alloy grid as the battery plate becomes a lower contact between the grid and the positive active material than a lead acid storage battery using a grid of the Pb—Sb alloy as the battery plate, and thus the former battery has a problem of deterioration in battery characteristics such as deep charge-discharge cycle life at high temperatures.

One cause for such a problem is considered that the Pb—Ca—Sn alloy is oxidized and corroded during the use of the battery and, as a result, it grows or deforms to make a much lower contact between the grid and the positive active material.

Furthermore, since the stress strain is concentrated on the nodes of the grid when subjected to the expanding process, the stress strain concentration accelerates the corrosion of the nodes and these nodes are selectively more rapidly corroded as compared with the other portions.

A method of improving the contact between the grid and the positive active material is proposed by U.S. Pat. No. 4,906,540 in which a thin film of a Pb—Sb alloy is applied to the surface of a grid of a Pb—Ca—Sn alloy and the film is integrated to the grid.

However, conventional methods of making the expanded grid of the Pb—Ca—Sn alloy cannot satisfy both the workability in expanding of the alloy in a sheet form and the strength of the resulting grids. That is, the Pb—Ca—Sn alloy sheet can easily be expanded when the sheet is soft, but some alloy compositions do not provide a strength enough to stand the fabrication of the battery even after subjected to aging.

On the contrary, when the Pb—Ca—Sn alloy sheet is hard, there is the problem that the expanding of the sheet is difficult.

Owing to this problem, when the mechanical strength of the expanded grid is low, the grid grows or deforms to a large extent during the operation of the battery, resulting in the lowering of contact between the grid and the active material and reduction of the cycle life of the battery.

When the strength of the expanded grid is high, stress strain is concentrated on the nodes of the grid when expanded and hence the corrosion of the nodes rapidly proceeds.

The effect of a thin film of a Pb—Sb alloy applied to the surface of the grid of a Pb—Ca—Sn alloy is reduced in half if the corrosion resistance and strength of the grid as base of the Pb—Ca—Sn alloy are insufficient.

SUMMARY OF THE INVENTION

The first object of the present invention is to provide a method of making a battery plate for a lead acid storage battery, comprising an expanded grid of a Pb—Ca—Sn alloy, inhibited from corrosion and growth.

The second object of the present invention is to provide a method of making a battery plate for a lead acid storage battery, comprising an expanded grid of a Pb—Ca—Sn alloy, giving a contact between an active material and the grid, improved so that the active material is prevented from coming off from the battery plate during the use thereof.

The third object of the present invention is to provide a lead acid storage battery having an excellent charge-discharge cycle life by applying a thin film of an antimony-containing lead alloy onto the expanded grid.

In order to solve the above-mentioned problems and to attain the above-mentioned objects, the method of making the battery plate according to the present invention comprises expanding a Pb—Ca—Sn alloy sheet having a tensile strength of 6.0 kg/mm$^2$ or less and containing 0.05–0.09% by weight of Ca and 0.6–1.8% by weight of Sn to produce a grid, filling the expanded grid with an active material paste and then aging the expanded grid to increase the tensile strength of the grid to 7.0 kg/mm$^2$ or higher. The aging of the grid filled with the active material is preferably carried out by a heat treatment.

More preferably, the expanded grid is produced by applying a thin film of an antimony-containing lead base alloy to the surface of a Pb—Ca—Sn alloy sheet having a tensile strength of 6.0 kg/mm$^2$ or lower and containing 0.05–0.09% by weight of Ca and 0.6–1.8% by weight of Sn, rolling them to form an integrated sheet and then expanding the integrated sheet.

The method of making the positive battery plate according to the present invention is featured in using a Pb—Ca—Sn alloy containing 0.6–1.8% by weight of Sn, which can be subjected to the expanding process in a relatively soft and easily extensible state, because the alloy has a tensile strength of 6.0 kg/mm$^2$ or lower.

Accordingly, the concentration of stress strain on the nodes of the notched grid can be avoided during the expanding process, and the corrosion of the nodes can be inhibited.

Since this expanded grid is filled with an active material paste and thereafter subjected to a heat treatment to increase the tensile strength of the grid to 7.0 kg/mm$^2$ or higher. Thus, the strength of the grid can be improved and the growth of the grid during the operation of battery can be inhibited.

Therefore, the lowering of the contact between the grid and the active material or the releasing of the active material from the grid can be prevented because of the above-mentioned inhibition of the corrosion or growth of the grid during the operation of battery and, as a result, lead acid storage batteries having an excellent charge-discharge cycle life such as a deep charge-discharge cycle life at high temperatures can be provided.

Furthermore, when a thin film of an antimony-containing lead base alloy is provided on the surface of a Pb—Ca—Sn alloy sheet, the contact between the grid and the active material can be made sufficient due to the action of Sb to chemically bond the grid and the active material.

BRIEF DESCRIPTION OF THE DRAWINGS

FIG. 1 is a graph showing the relation between the Sn content of the Pb—Ca—Sn alloy sheet and the tensile strength and the growth of the sheet.

FIG. 4 is a schematical view of a battery plate using the expanded grid of the present invention.

FIG. 5 is a graph showing the relation between the tensile strength of a Pb—Ca—Sn alloy sheet and the cycle life of a lead acid storage battery using an expanded grid comprising the alloy sheet.

BEST MODES FOR CARRYING OUT THE INVENTION

Figure 2:
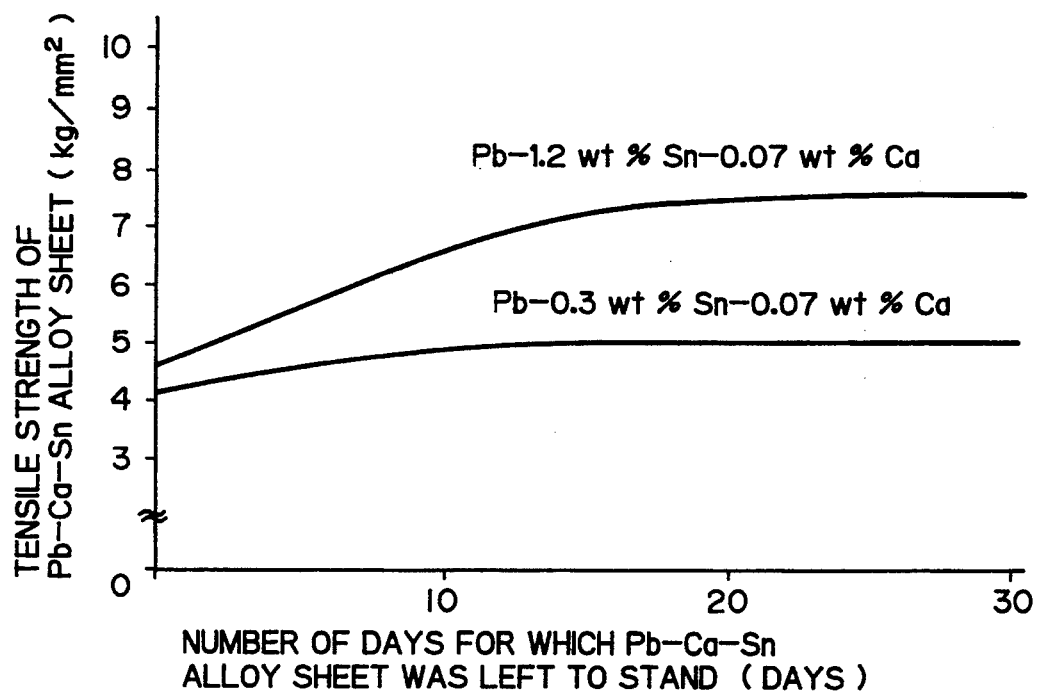
FIG. 2 is a graph showing the relation between the aging time and the tensile strength of a Pb—Ca—Sn alloy containing 0.3% by weight of Sn and a Pb—Ca—Sn alloy containing 1.2% by weight of Sn.

Examples of the present invention will be illustrated below referring to the drawings.

First, FIG. 1 shows the relations between the Sn content (wt %) of the Pb—Ca—Sn alloy sheet containing 0.07 wt % of Ca and the tensile strength and growth of the alloy sheet.

The Pb—Ca—Sn alloy sheet used was made by rolling a slab of 80 mm wide and 10 mm thick to a sheet of 1.0 mm thick. The resulting sheet was then left to stand for aging for 30 days at room temperature to increase its strength. The tensile strength and growth of the test pieces of the Pb—Ca—Sn alloy sheet were measured before and after the aging.

The tensile strength is expressed by a quotient obtained by dividing the maximum load applied to the test pieces at the tensile test by the cross-sectional area of the initial test pieces.

As shown in FIG. 1, with increase in the Sn content of the Pb—Ca—Sn alloy, the tensile strength of the alloy sheet increased and the growth decreased. Further, the tensile strength of the lead alloy sheet having an Sn content of less than 2.0 wt % was lower than 6.0 kg/mm$^2$ before aging, whereas the tensile strength of the aged sheet was higher than 7.0 kg/mm$^2$, especially when the Sn content was higher than 0.9 wt %. Thus, it can be seen that the tensile strength of the lead alloy having a high Sn content is high when subjected to aging.

Furthermore, FIG. 2 shows the relation between the number of days for which the sheet was left to stand for aging and the change in the tensile strength of the aged sheet. The sheets used here were of a Pb—Ca—Sn alloy containing 0.3 wt % of Sn and of a Pb—Ca—Sn alloy containing 1.2 wt % of Sn.

As shown in FIG. 2, the tensile strength of the Pb—Ca—Sn alloy sheet containing 0.3 wt % of Sn was about 4.0 kg/mm$^2$ before aging and about 5.0 kg/mm$^2$ after aging. Therefore, when a grid was made by subjecting this alloy sheet to an expanding process, the workability was good, but the expanded grid was low in strength and thus, were not obtained any grids usable for providing batteries having an excellent charge-discharge characteristics. However, the Pb—Ca—Sn alloy sheet containing 1.2 wt % of Sn had a tensile strength of about 4.5 kg/mm$^2$ before aging and was soft. Hence, when the alloy sheet in this state was subjected to the expanding process, the workability was good, and no stress strain was concentrated on the nodes of the expanded grid which are apt to easily corrode and, in addition, the tensile strength increased to about 7.5 kg/mm$^2$ when aged. Accordingly, the strength of the expanded grid can be increased and the growth of the grid can be inhibited during the operation of batteries.

Figure 3:
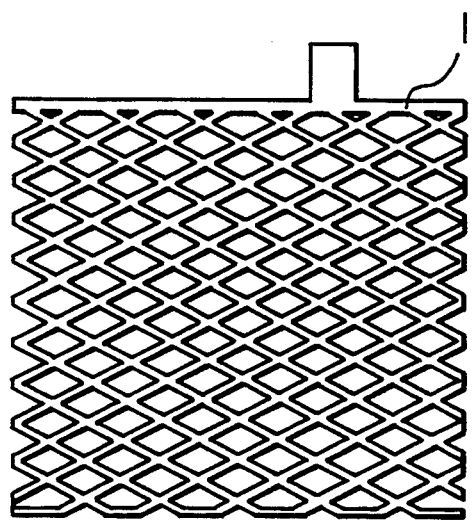
FIG. 3 is a schematical view of the expanded grid of the present invention.

Next, Pb—Ca—Sn alloy sheets having Sn contents of 0.3, 0.6, 0.9 and 1.2 wt % were subjected to the expanding process before and after aging, to make respective grids 1 as shown in FIG. 3. The aging was carried out by heat treating the sheet at 70° C. for 24 hours. The resulting expanded grids were filled with active material paste 2 to make the positive battery plate 3 as shown in FIG. 4. The grid made from the unaged alloy sheets were subjected to the aging by the heat treatment at 70° C. for 24 hours. Then, lead acid storage batteries A–H were fabricated using these positive battery plates and a known negative battery plate, separator and electrolyte. Furthermore, a thin film of an antimony-containing lead base (Pb—Sn—Sb) alloy containing 5 wt % of Sn and 5 wt % of Sb, the balance of lead, was applied to slabs of Pb—Ca—Sn alloys containing 0.3, 0.6, 0.9 and 1.2 wt % of Sn, respectively. Slabs having the thin film applied thereon were rolled to prepare the alloy sheets. These alloy sheets were subjected to the expanding process before and after aging, and lead acid storage batteries I-P were fabricated in the same manner as above. Moreover, lead acid storage batteries Q-S were fabricated in the same manner as above, except that the thin films of the antimony-containing lead base (Pb—Sb) alloy containing 3 wt %, 5 wt % and 8 wt %, respectively, and the balance of lead, as shown in Table 1 was used in place of the thin film of the Pb—Sn—Sb alloy.

For these lead acid storage batteries A-S, the Sn content of the Pb—Ca—Sn alloy sheet, the tensile strength of the Pb—Ca—Sn alloy sheet when subjected to the expanding process and the state of application of the thin film of the Pb—Sn—Sb alloy are shown in Table 1.

TABLE 1

| | Sn Content of Pb—Ca—Sn Alloy Sheet (wt %) | Tensile Strength of Pb—Ca—Sn Alloy sheet Expanded After/Before Aging | Application of Thin Film, of Sb—Containing Pb Alloy |
|---|---|---|---|
| A | 0.3 | 4.9 (after aging) | Not (Pb—Sn—Sb) |
| B | 0.6 | 6.2 (after aging) | " |
| C | 0.9 | 7.0 (after aging) | " |
| D | 1.2 | 7.6 (after aging) | " |
| E | 0.3 | 4.0 (before aging) | " |
| F | 0.6 | 4.5 (before aging) | " |
| G | 0.9 | 4.9 (before aging) | " |
| H | 1.2 | 5.0 (before aging) | " |
| I | 0.3 | 4.9 (after aging) | Yes |
| J | 0.6 | 6.2 (after aging) | " |
| K | 0.9 | 7.0 (after aging) | " |
| L | 1.2 | 7.6 (after aging) | " |
| M | 0.3 | 4.0 (before aging) | " |
| N | 0.6 | 4.5 (before aging) | " |

TABLE 1-continued

| | Sn Content of Pb—Ca—Sn Alloy Sheet (wt %) | Tensile Strength of Pb—Ca—Sn Alloy sheet Expanded After/Before Aging | Application of Thin Film, of Sb—Containing Pb Alloy |
|---|---|---|---|
| O | 0.9 | 4.9 (before aging) | " |
| P | 1.2 | 5.0 (before aging) | " |
| Q | 0.9 | 4.9 (before aging) | Yes (Pb-3% Sb) |
| R | 0.9 | 4.9 (before aging) | Yes (Pb-5% Sb) |
| S | 0.9 | 4.9 (before aging) | Yes (Pb-8% Sb) |

Then, these lead acid storage batteries A–S were subjected to a charge-discharge cycle life test at 75° C. The results are shown in Table 2.

TABLE 2

| Battery | Number of Cycles |
|---|---|
| A | 1400 |
| B | 1600 |
| C | 1800 |
| D | 1800 |
| E | 1400 |
| F | 1700 |
| G | 2400 |
| H | 2700 |
| I | 2000 |
| J | 2200 |
| K | 2400 |
| L | 2400 |
| M | 2200 |
| N | 3200 |
| O | 4800 |
| P | 5400 |
| Q | 4600 |
| R | 4800 |
| S | 5000 |

As is seen from Table 2, the charge-discharge cycle life was able to be prolonged by increasing the Sn content of the Pb—Ca—Sn alloy grid, especially by increasing the Sn content to more than 0.6 wt %. For the grid of the Pb—Ca—Sn alloy having a high Sn content, the batteries E–H using the grid made from the alloy sheet expanded and then aged, were improved in the charge-discharge cycle life over the batteries A–D using the grid made from the alloy sheet aged and then expanded. Moreover, the charge-discharge cycle life was able to be improved by applying the Pb—Sn—Sb alloy thin film to the surface of the Pb—Ca—Sn alloy sheet. In this case, too, the Pb—Ca—Sn alloy sheet having the Pb—Sn—Sb alloy thin film applied thereon, expanded and then aged, was improved over the sheet aged and then expanded. The batteries Q—S were excellent in the cycle life, because the increase in strength by the aging was conspicuous due to the action of Sb and the contact between the grid and the active material was utterly satisfactory.

It is considered that the above effect was obtained because in the case of the batteries of the present invention using the grid made from the Pb—Ca—Sn alloy sheet expanded and then aged, the concentration of stress strain on the nodes of the expanded grid can be inhibited, since the expanding process is carried out while the Pb—Ca—Sn alloy is in the relatively soft state of a low tensile strength and thus the corrosion of the nodes can be prevented. It is further considered that this prevention of corrosion is another effect of the Pb—Sn—Sb alloy thin film.

Further, according to the present invention, the expanded grid of a Pb—Ca—Sn alloy filled with an active material is subjected to aging, during which the contact between the active material and the grid is improved and thus the paste can be strongly held on the grid and, in addition, the tensile strength of the Pb—Ca—Sn alloy is raised up to 7.0 kg/mm$^2$ or higher when aged.

Therefore, the growth or distortion of the grid during the operation of batteries can be inhibited and, in addition, the contact between the active material and the grid can be improved and the charge-discharge cycle life of batteries can be improved.

Accordingly, the tensile strength of the Pb—Ca—Sn alloy sheet was changed by changing the aging conditions and further the lead alloy sheets having the respective tensile strengths were subjected to the expanding process to make expanded grids, and the charge-discharge cycle life characteristics of deep discharge and-/or high temperatures of the batteries fabricated using these grids were examined.

The Pb—Ca—Sn alloy sheet used here contained 0.07 wt % of Ca and 0.9 wt % of Sn. Onto the surface of this alloy sheet was applied a thin film of 0.02 mm thick of a Pb—Sn—Sb alloy containing 5 wt % of Sn and 5 wt % of Sb. FIG. 5 shows the relation between the tensile strength of the lead alloy sheet and the charge-discharge cycle life of the lead acid storage batteries using the expanded grids comprising the lead alloy sheets.

As shown in FIG. 5, when grids made by expanding the lead alloy sheets of higher than 6.0 kg/mm$^2$ in tensile strength were used in batteries, the charge-discharge cycle life abruptly decreased.

Thus, it is effective for improving the charge-discharge cycle life of lead acid storage batteries to produce a positive battery plate by expanding a Pb—Ca—Sn alloy sheet having a tensile strength of 6.0 kg/mm$^2$ or lower to make a grid, filling this grid with an active material paste, and then heat treating the grid to increase the tensile strength of the expanded grid to 7.0 kg/mm$^2$ or higher.

In the above example, the aging conditions were 70° C. and 24 hours, but the similar effects were obtained when the aging was carried out under a higher-temperature and shorter-time condition or a lower-temperature and longer-time condition, specifically, in the range of from a 60° C.-28 hour condition to 80° C.-20 hour condition.

Figure 6:
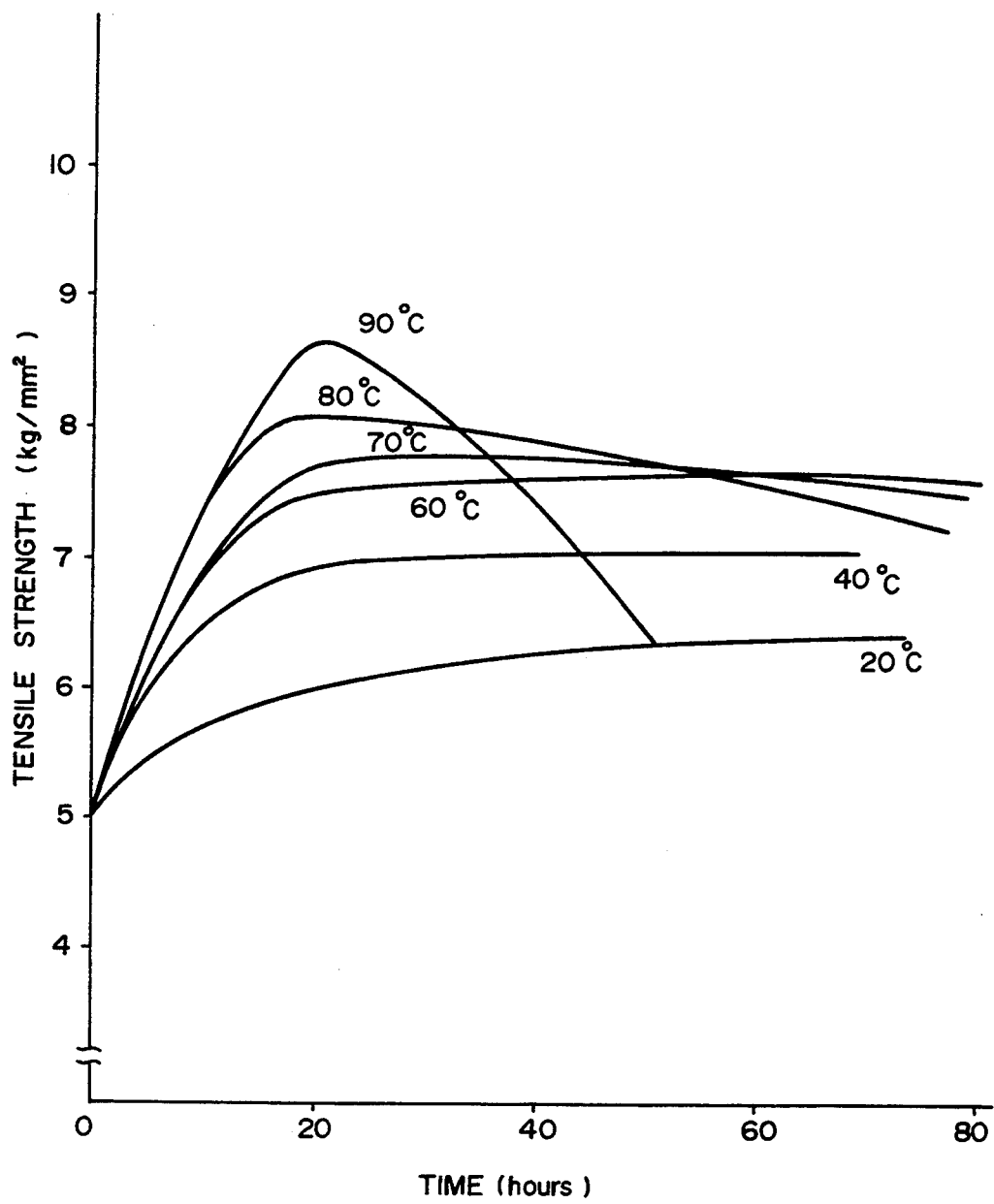
FIG. 6 is a graph showing the relation between the tensile strength of a Pb-0.07Ca-1.2Sn alloy and the aging time at each of various temperatures.

FIG. 6 shows the relation between the tensile strength of a Pb-0.07% Ca-l.2% Sn alloy grid and the aging time at each of various temperatures. From FIG. 6, it is seen that the greater the maximum tensile strength of the grid, the higher the aging temperature. Thus, the grid can be made harder. However, after the tensile strength reached the maximum one, it lowers at a greater extent with the aging temperature being higher. Therefore, it is important that the aging time is controlled to avoid such lowering of the tensile strength. That is, the grid is properly left to stand for 20-28 hours for the aging. Further, after the tensile strength reached the maximum one at 90° C., it lowers to too great an extent to control the aging time and stably obtain the desired strength of the grid. In order to stably obtain the desired high tensile strength of the grid, the aging temperature is in the range of 60°-80° C. under the above aging time condition, as is seen from FIG. 6.

This aging temperature condition is approximately the same as one suitable for aging the active material. Therefore, the heat treatment of a pasted grid under a proper degree of moisture can effect the aging of both the active material and the grid. This means that the grid can be properly aged without giving an excess of heat treatment to the grid.

As explained above, according to the present method for making a battery plate for lead acid storage batteries, the battery plate is made by expanding a Pb—Ca—Sn alloy sheet having a tensile strength of 6.0 kg/mm$^2$ or lower and an Sn content of 0.6–1.8% by weight to make a grid, filling this grid with an active material paste, and then aging the grid to increase the tensile strength of the expanded grid to 7.0 kg/mm$^2$ or higher. Therefore, the expanding process of the Pb—Ca—Sn alloy sheet is a processing of the sheet in a soft state and so, the workability is superior and furthermore, the concentration of stress strain at the nodes of the grid can be inhibited and thus, the corrosion of the nodes can be inhibited. The strength of the grid is improved when aged and a battery plate of high strength prevented from growth of the grid can be obtained. Therefore, there can be provided a lead acid storage battery in which the active material does not come off from the battery plate during the operation of the battery and which is excellent in charge-discharge cycle life characteristics of deep discharge and/or at high temperatures. The use of the expanded grid of a sheet having the antimony-containing lead alloy applied thereon and the combination of the conditions as mentioned above makes it possible to synergistically prolong the charge-discharge cycle life.

What is claimed is:

1. A method of making a battery plate for lead acid storage batteries, which comprises the steps of applying a film of an antimony-containing lead base alloy to the surface of a lead-calcium-tin (Pb—Ca—Sn) alloy sheet having a tensile strength of 6.0 kg/mm$^2$ or lower and comprising 0.05–0.09% by weight of calcium, 0.6–1.8% by weight of tin and the balance of lead, rolling them together to form an integrated sheet, then expanding the sheet to make a grid, filling this expanded grid with an active material paste, and then aging the grid to increase the tensile strength of the expanded grid to 7.0 kg/mm$^2$ or higher.

2. A method according to claim 1, wherein the film of the antimony-containing lead alloy contains 3–8% by weight of antimony and the expanded grid is aged by a heat treatment to increase the tensile strength of the expanded grid to 7.0 kg/mm$^2$ or higher.

3. A method according to claim 2, wherein the heat treatment comprises exposing the expanded grid to a condition of 60°–80° C. for 20–28 hours.

* * * * *